UNITED STATES PATENT OFFICE.

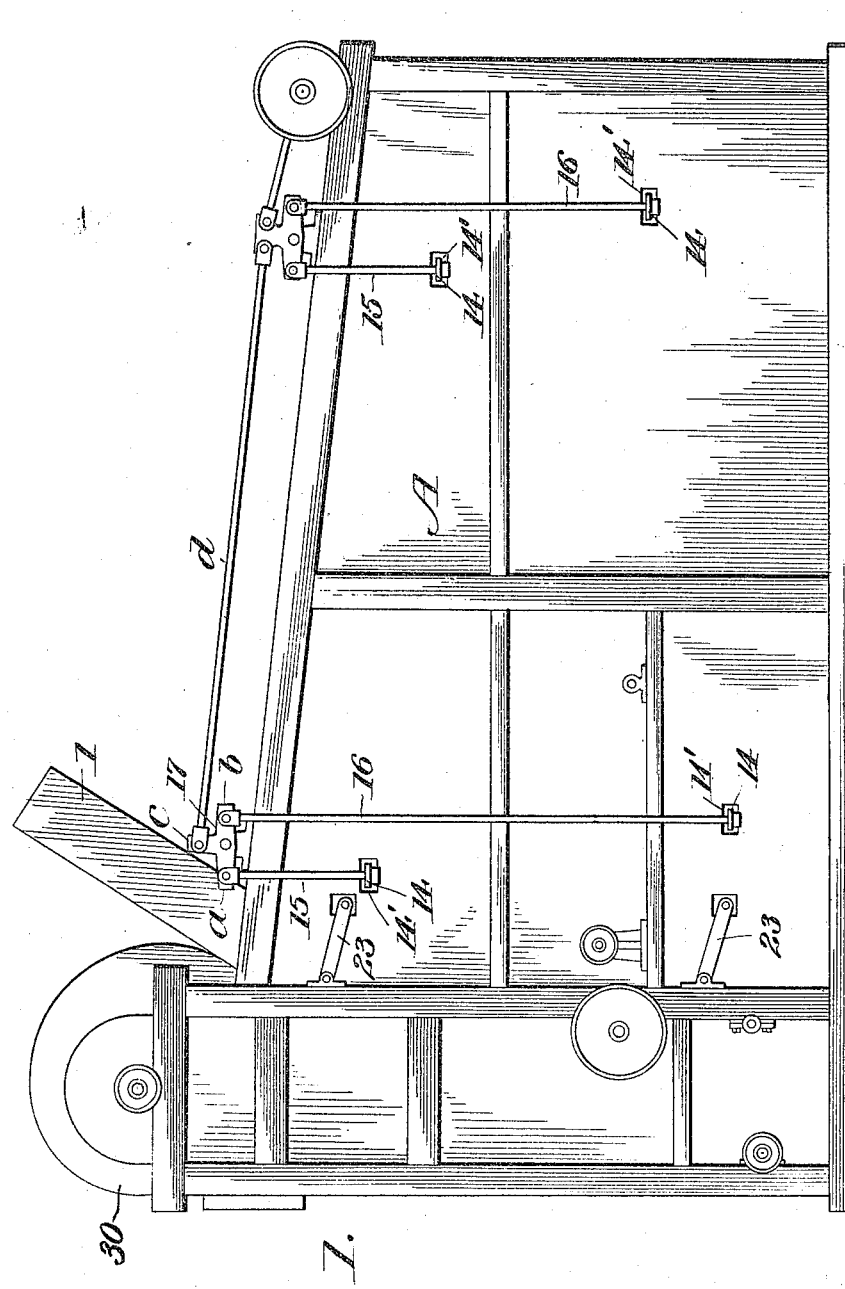

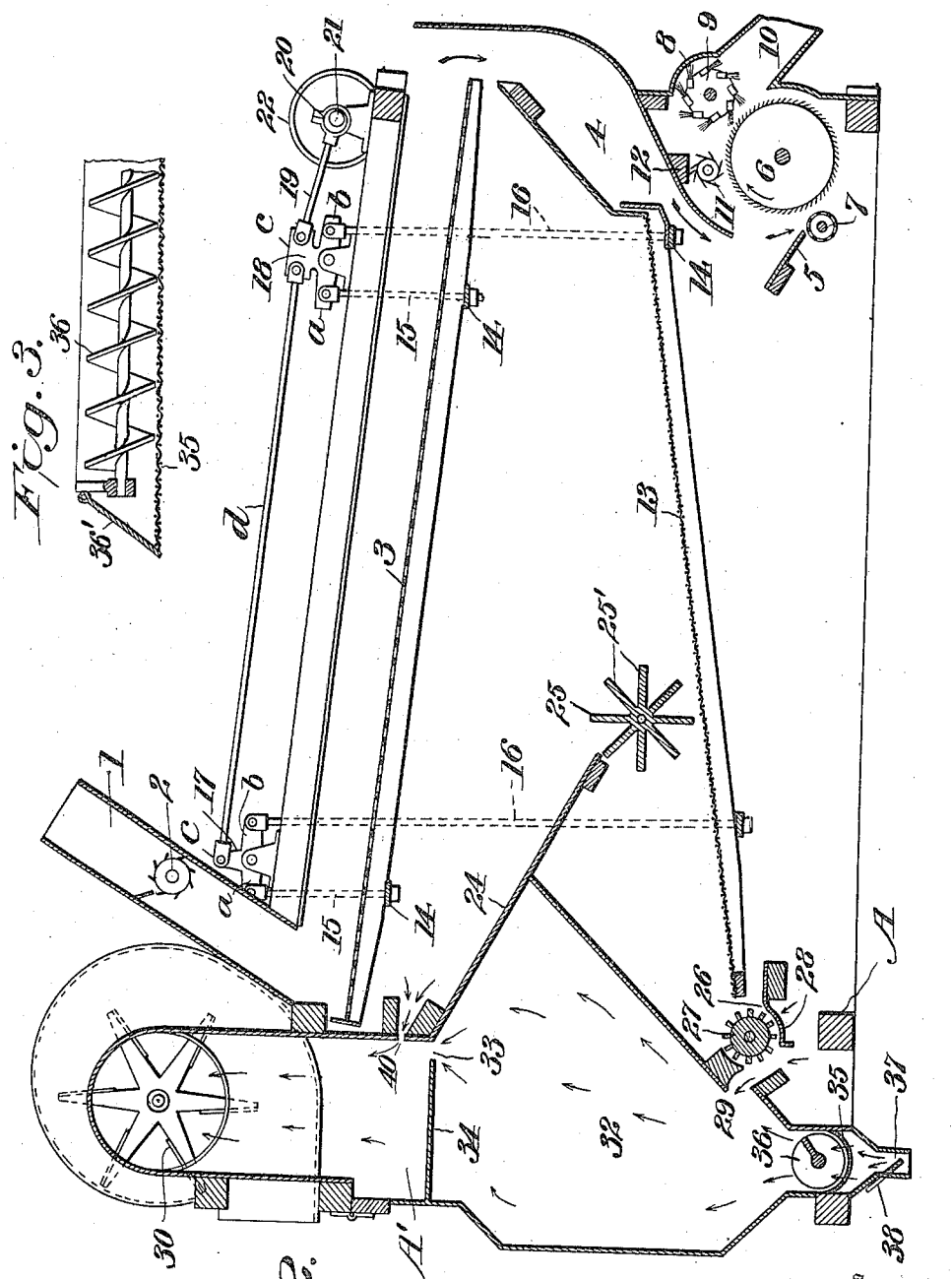

JAMES H. CARY, OF MEMPHIS, TENNESSEE.

COTTON-SEED CLEANER.

1,236,147.  Specification of Letters Patent.  Patented Aug. 7, 1917.

Application filed July 18, 1916.  Serial No. 109,985.

*To all whom it may concern:*

Be it known that I, JAMES H. CARY, a citizen of the United States, residing at Memphis, in the county of Shelby and State of Tennessee, have invented certain new and useful Improvements in Cotton-Seed Cleaners, of which the following is a specification.

My invention relates to certain new and useful improvements in machines designed particularly for the cleaning of cotton seed, and the invention consists of the parts, and the constructions, arrangements and combinations of parts which I will hereinafter describe and claim.

In the accompanying drawing forming part of this specification and in which similar reference characters indicate like parts in the several views;—

Figure 1 is a side elevation of a cotton-seed cleaner embodying my invention.

Fig. 2 is a longitudinal sectional view of the same.

Fig. 3 is a sectional detail of a portion of the screen plate, 35, and conveyer, 36, showing the gravity valve or door, 36'.

In the said drawings A represents a framework of suitable construction and dimensions and within and upon which the various operating parts of the machine are contained, said framework having within the head end thereof a flue or passage, A', the purpose of which I will hereinafter describe.

The head end of the machine is connected with a supply chute, or inlet, 1, for the mass of seed to be cleaned and within this chute or passage is mounted a suitable feed roller, 2, to assist in the more even distribution or feed of the seed into the machine. Within the frame or casing is mounted an appropriate screen, 3, upon which the seed to be cleaned is discharged and subjected to the initial cleaning action. The screen is normally set at an incline with the higher end adjacent the head of the machine and underlying the aforesaid supply chute or seed inlet, 1, and over this screen the seed is appropriately advanced and separation of the foreign matter is partially effected and the foreign matter discharged over the lower or tail end of the screen.

At the tail end of the machine I employ a suitable mechanism for separating the screenings or waste from the boll screen, 3, this mechanism comprising an appropriate chute, 4, into which the screen discharges from its lower end the aforesaid tailings or waste. The tailings delivered into the chute, 4, are carried downward over the inclined bottom thereof toward an inclined hull board, 5, which forms a hopper-like space, into which the cotton and lighter material will drop, while the heavier material such as stones, nails, and other foreign matter, will, in practice, jump over the upper end of this board, and thus separate themselves from the cotton and light material, which latter material is subjected to the action of appropriate cleaning devices which in the present instance are shown as comprising a toothed drum, 6, opposing which is a perforated hull-roller, 7, which is separated from the toothed roller to form a passage into which the inclined hull-board, 5, directs the aforesaid lighter rejected material of the screen, 3.

In an inclosure or case, 8, fixed to the main frame is mounted a rotary brush, 9, positioned in suitable relation to the toothed drum, 6, and adapted to sweep the adhering cotton from the teeth of the drum and deliver the same into an appropriate outlet or chute, 10, and overlying the toothed drum, is a hull-roller, 11, having inclined teeth adapted to operate upon the hull-particles carried with the cotton on the toothed roller, the teeth of the hull-roller operating through spaces in a cleaner bar, 12, to maintain the teeth of the roller clean as well understood in this art.

Within the frame or casing of the machine and underlying the first-named screen and made separate therefrom is a second screen, 13, of finer mesh than the first screen, 3, and inclined in a direction opposite to the inclination of said first screen, and upon which second screen the seed and any foreign material mixed with the same has passed through the meshes of the first screen, are received and subjected to a further separation of the seed from said foreign matter.

The screens, 3, and 13, are mounted upon suitable supports in the form of transverse bars, 14, the ends of which extend through openings, 14', in the sides of the frame or casing, A, and these supports have connected to them the lower ends of suitable rods, or links, 15, 16, the upper ends of which are respectively connected to oppositely extending arms, $a$, $b$, of centrally pivoted rockers, 17, 18, suitably mounted on the upper portion of the frame or casing, each of said rockers having a third or intermediate arm, $c$, which extends upwardly and is suitably connected as by means of a rod, $d$, whereby the rockers operate in unison. The rocker, 18, near the lower or tail-end of the machine is secured to one end of an operating rod, 19, whose opposite end is suitably connected to an eccentric or crank, 20, on a shaft, 21, journaled transversely across the lower or tail end of the machine, said shaft having a band-wheel, 22, or other suitable means by which it is operated whereby the rockers may be oscillated about their pivotal centers to impart vertical movement to the rods, 15, 16, and consequently an up and down movement to the upper and lower screens.

By reference to Fig. 1 it will be seen that the ends of the screens nearest the head-end of the machine are connected on the outside of the frame or casing to one end of suitable links, 23, whose opposite ends are pivotally mounted on the frame or casing at a point somewhat higher than the point of connection of the first-mentioned ends of the links with the screen, whereby when the screens are moved up and down through the medium of the rockers and connecting rods before mentioned, the links are also moved from their normal inclined position into a more nearly horizontal plane, thus imparting to the screens a third or forward movement in unison with the up and down movement, the effect of which combined movement is to impart a tossing action to the seed and other material on the screens.

Secured to the inside of the frame or casing between the two screens, 3, and 13, and declining downwardly from the head toward the tail end of the machine is a guide plate or board, 24, upon which the seed delivered through the upper or head end of the first screen is received; and mounted within the lower portion of the casing just over the second-named screen and below the lower end of the said board or plate, is a wheel, 25, of paddle-construction; that is, the wheel is formed of a series of spaced radial vanes, 25′, forming therebetween suitable pockets which successively register with the lower end of the board or plate, 24, and are adapted to receive the seed passing thereover and which seed is more or less violently projected toward the higher end of the lower screen, 13, by centrifugal action due to the rotation of said wheel.

On the lower screen, 13, the seed and any fine foreign matter which may have passed the first cleaning screen, are received and subjected to the tossing action before mentioned, with the result that the first foreign matter will sift through the screen while the seed will travel down said screen to the lower end thereof and into a chamber, 26, in which is mounted a rotary feeder or valve, 27, which is shown as being in the form of a wheel having radial vanes which sweep over the lower curved floor, 28, of the chamber and thus feed or advance the seed in charges into a passage, 29, which is formed in the frame of the machine and is open at the bottom to admit a draft of air induced by a suction fan, 30, or the like suitably connecting with the upper end of the flue, A′, whereby the seed and any remaining associated foreign material delivered by the aforesaid valve or feeder, 27, are drawn into a suction chamber, 32.

The upper end of this chamber connects with the air flue, A′, through a more or less restricted passage, 33, which is produced by extending a baffle or plate, 34, partially across the upper end of the chamber so as to produce a narrow outlet from the suction chamber; this is desirable, as I am able to get a more uniform strength of suction in said chamber. In the chamber, 32, there is effected a separation of the seed from the remaining associated lighter foreign matter, the separation being due to the difference in specific gravity of the several particles, the lighter material being caught up by the draft through the chamber and carried through the opening, 33, and into the flue, A′, and finally discharged from the machine through the fan-casing, while the heavier seed settle in the chamber and into a hopper-like bottom thereof, and onto a curved screen plate, 35, over which operates an appropriate screw conveyer, 36, for advancing the seed along said bottom to an appropriate outlet and which outlet, as shown in Fig. 3, may be controlled by a suitable inclined gravity or like valve or door, 36′, the tendency of which is to close and cut-off the inlet or air therethrough, but which door will open under the pressure of the seed advanced thereagainst by the operation of the screw-conveyer.

Beneath the screw-conveyer and its perforated screen bottom, 35, the frame of the machine is formed with an inlet, 37, for air and which inlet is controlled by an appropriate valve, 38, which enables me to limit the amount of air admitted through said inlet and into the suction chamber, 32. This air on its way to the suction chamber passes through the screen bottom 35, over which the conveyer is advancing the seed, and any remaining light particles associated with the seed will be picked up by the passing current and carried into the suction chamber and finally through the passage, 33, and flue, A′, into the fan case and be delivered with other rejected material, as before explained. Any sand or small particles too heavy to be picked up by the draft and remaining associated with the seed, will pass through the screen and drop through the air passage, 37.

By means of the valve, 38, and the air-inlet passage, 37, I am enabled to control the admission of air therethrough, and hence I may cut down this air to such an extent that it will not be sufficient to elevate the clean seed being delivered over the screen bottom by the conveyer, but it will have sufficient power to pneumatically separate from the seed any remaining trashy particles, or faulty seed which are sufficiently light to be floated off from the clean seed and delivered into the suction chamber, and finally into the flue, A', for discharging from the machine.

It will also be observed that at the upper end of the inclined board or plate, 24, there is a passage, 40, which communicates with the flue, A', immediately above the restricted passage, 33, connecting the flue with the suction-chamber, 32, whereby a draft is induced over the upper surface of said board or plate and through the body of seed which is dropping through the head-end of the screen, 3, and onto said board. By reason of this induced draft over the board and through the falling seed much of the foreign matter which is associated with the seed passing through the first screen will be picked up by the draft and separated from the seed and carried through said passage, 40, directly into the flue to be pneumatically discharged with the remaining particles entering said flue.

The operation of the machine is substantially as follows:

The seed is fed into the supply chute, 1, and fed to the first screen, 3, by the feed roller, 2, or equivalent device. The screen is given a combined up-and-down and lengthwise movement due to the rocker-arms and connections before described and hence it will be apparent that the material is thrown toward the tail-end of the screen, the seed passing through the screen and the associated coarser foreign matter being progressively advanced toward the tail-end of the machine and being finally discharged thereover and falling into the chute, 4. Any seed cotton or hull-particles of value dropping into this chute will fall into the hopper-like space formed between the hull board, 5, and the toothed roller, 6, and will be subjected to the action of the cleaning devices, at this the tail end of the machine and which devices may be of any appropriate character and including those shown and before described.

The particles passing through the head-end of the screen, 3, drop onto the board, 24, and are subjected to the action of the current of air passing thereover, while the material delivered from the board is received into the pockets of the roller, 25, is thrown toward the high-end of the underlying screen, 13. On this screen there is effected a further separation, the small material passing through the screen while the coarser matter travels down the screen and is fed into the passage, 29, where it meets the incoming current of air and is forcibly drawn into the suction-chamber, 32, where is again effected the separation of particles by reason of the difference in specific gravity thereof, the lighter particles being drawn through the flue and into the fan-case and the heavier particles in the form of clean seed, being finally delivered by the screw conveyer to a point outside of the machine.

The machine described is simple in construction and the parts are so arranged that the seed is subjected to more or less violent agitation to facilitate the separation of the seed from associated foreign matter and final complete separation of foreign particles, dust, etc., mixed with the seed passing over the final screen, is effected pneumatically with the result that the output of the machine is seed in such thoroughly cleaned condition that it is ready for the usual commercial purposes.

Having thus described my invention what I claim as new and desire to secure by Letters Patent is:—

1. In a cleaning machine of the character described, the combination with a frame or casing having a feed inlet, of preliminary and secondary separators, said casing having an upwardly enlarging suction chamber into which the oversize passing from the secondary separator, is delivered and separated by gravity, said chamber having an air passage communicating therewith for uplifting said oversize into the chamber, and having a flue for delivering rejected particles, and means pneumatically delivering lighter particles of oversize from the preliminary separator into said flue, said chamber having a restricted connection with the flue.

2. In a cleaning machine of the character described, the combination with a frame or casing having a feed inlet, of preliminary and secondary separators, and an upwardly enlarging pneumatic separating chamber connected with the lower end of said secondary separator and in which chamber the screened material from the secondary separator is separated by gravity, and means including a rotary feeder at the discharge end of the secondary separator for conducting the oversize therefrom to the chamber, said chamber having an air passage communicating with it for uplifting said oversize into the chamber, and said chamber having a restricted outlet.

3. In a cleaning machine of the character described, the combination with a frame or casing having a feed inlet, of a pair of screens suspended at opposite inclines in said casing, means for imparting to said screens, a simultaneous combined up and down and longitudinal movement whereby material under treatment on the screens is given a tossing action toward the delivery ends of the screens, said means comprising rockers on opposite portions of the casing, suspending rods connecting the rockers to opposite end portions of the screens, links on the outside of the frame connecting one end of the screens to a fixed portion of the casing, said links being normally inclined to the horizontal and adapted to impart a horizontal motion to the screens in unison with their up and down movements, means for operating the rockers, a separator at the discharging end of one of said screens, and means for feeding screened material received from one of said screens into said separator.

4. In a cleaning machine of the character described, the combination with a frame or casing having a feed-inlet and upper and lower vibratory screens mounted therein, of a revoluble member mounted in the casing above the lower screen and having pockets to successively receive the material to be screened, said member adapted to centrifugally project said material toward one end of the lower screen, and a suction chamber communicating with the discharge end of the screen and into which chamber the screened material is delivered and separated by gravity, said chamber having an air passage communicating with it for uplifting the screened material into the chamber.

5. In a cleaning machine of the character described, the combination with a frame or casing having a feed inlet, of upper and lower vibratory screens mounted at an incline in said casing, a revoluble member above the lower screen and removed a substantial distance from the high end thereof and having pockets adapted to successively receive the material to be screened, means for directing the material into said pockets during the rotation of said member, and means for revolving said member whereby the material is projected toward the high end of said lower screen, and a suction chamber communicating with the discharge end of the screen and into which chamber the screened material is delivered and separated by gravity, said chamber having an air passage communicating with it for uplifting the screened material into the chamber.

6. In a cleaning machine of the character described, the combination with a frame or casing having a feed-inlet, of upper and lower vibratory screens mounted at an incline in said casing, a revoluble member above the lower screen and removed a substantial distance from the high end thereof, and having pockets adapted to successively receive the material to be screened, means for directing the material into said pockets during the rotation of said member, means for revolving said member whereby the material is projected toward the high end of said lower screen, and a suction chamber communicating with the lower end of the lower screen, said casing having an air-passage communicating with the suction chamber and into which passage the screened material is delivered and pneumatically directed into the chamber, and said casing having a flue leading from the suction chamber adapted to deliver rejected particles, said casing having a baffle extending across it to form a restricted entrance to said flue.

7. In a cleaning machine of the character described, the combination with a frame or casing having a feed-inlet, of upper and lower vibratory screens mounted at an incline in said casing, a revoluble member above the lower screen and removed a substantial distance from the high end thereof and having pockets adapted to successively receive the material to be screened, means for directing the material into said pockets during the rotation of said member, means for revolving said member whereby the material is projected toward the high end of said lower screen, a gravity separating chamber communicating with the lower end of the lower screen and into which the screened material is received.

8. In a cleaning machine of the character described, the combination with a frame or casing having a feed-inlet, of upper and lower vibratory screens mounted at an incline in said casing, a revoluble member above the lower screen and removed a substantial distance from the high end thereof and having pockets adapted to successively receive the material to be screened, means for directing the material into said pockets during the rotation of said member, means for revolving said member whereby the material is projected toward the high end of said lower screen, a receiving chamber communicating with the lower end of the lower screen, and into which the screened material is received, a gravity separating chamber within the casing, and means for delivering the screened material into the chamber, said chamber having separate outlets for cleaned and rejected particles.

9. In a cleaning machine of the character described, the combination with a frame or casing having a feed inlet, of preliminary and secondary separators, a receiving chamber communicating with the discharge of the secondary separator and into which the oversize is received, said casing having a suction chamber enlarging upwardly and having an air passage crossing the discharge of the receiving chamber and into which passage said oversize is delivered and pneumatically carried into the suction chamber, said casing having, also, a flue to deliver rejected particles, means for inducing a draft through said passage and into the path of the material delivered from said receiving chamber, and means for pneumatically separating lighter particles of undersize from the preliminary separator and conducting the same directly into said flue.

10. In a cleaning machine of the character described, the combination with a frame or casing having a feed inlet, of preliminary and secondary separators, a receiving chamber communicating with the discharge of the secondary separator and into which the oversize therefrom is received, said casing having a suction chamber enlarging upwardly and provided with a restricted outlet and having an air passage crossing the discharge end of the receiving chamber and in which passage the oversize of the secondary separator is delivered, and is pneumatically carried into the suction chamber, said casing having, also, a flue to deliver rejected particles, means for inducing a draft through said passage and into the path of the material delivered from said receiving chamber, means for regulating the strength of the air current through said chamber, and means for pneumatically separating lighter particles of undersize from the preliminary separator and conducting the same into said flue.

11. In a cleaning machine of the character described, the combination with a frame or casing, of preliminary and secondary separators, said casing having a suction chamber and having a receiving chamber which communicates with the secondary separator, and said casing having an air passage crossing the discharge end of the receiving chamber, and a rotary feeder within said receiving chamber for delivering oversize from the secondary separator into said air passage so that it may be picked up by the current and delivered into the suction chamber.

12. In a cleaning machine of the character described, the combination with a frame or casing having a feed inlet, and a suction chamber into which separation of particles according to specific gravities occurs, of preliminary and secondary separators, a rotary member above the secondary separator having peripheral pockets, and a directing board in advance of said secondary separator having its lower end terminating adjacent said member and adapted to deliver a portion of the undersize of the preliminary separator into successive pockets thereof, means for pneumatically conducting the undersize from the secondary separator into said suction chamber, said frame or casing having a flue into which material passing through the suction chamber is received, means including said board for pneumatically conducting the lighter particles of undersize from the preliminary separator directly into said flue, a screen bottom in the suction chamber on which the separated heavier particles settle, a conveyer operable over said bottom, and means for inducing an air current through said bottom, chamber and flue, for pneumatically separating the lighter from the heavier material delivered into the chamber from said secondary separator.

13. In a cleaning machine of the character described, the combination with a frame or casing having a feed inlet and having a flue and means for inducing an air current therethrough, of a preliminary separator, an inclined directing board beneath the head end of said separator, said frame or casing having a passage proximate the upper end of said board and connecting with said flue whereby an air current is induced over said board and through the mass of material being delivered thereto, for the purpose of separating the lighter particles of said material and delivering the same directly into said flue.

14. In a machine of the character described, the combination of a frame or casing and a separating screen mechanism therein, said casing having a chute adapted to receive the tailings delivered over the discharge end of the screen, an inclined board within the frame upon which the lighter portion of the tailings is received, the heavier portion of said tailings passing said board, and ginning devices associated with said board and into the range of action of which said lighter portion is directed thereby.

In testimony whereof I affix my signature.

JAMES H. CARY.

Copies of this patent may be obtained for five cents each, by addressing the "Commissioner of Patents, Washington, D. C."